Oct. 14, 1930.         G. E. CONNOLLY         1,778,144
                       FURNACE CONSTRUCTION
                       Filed Dec. 19, 1928
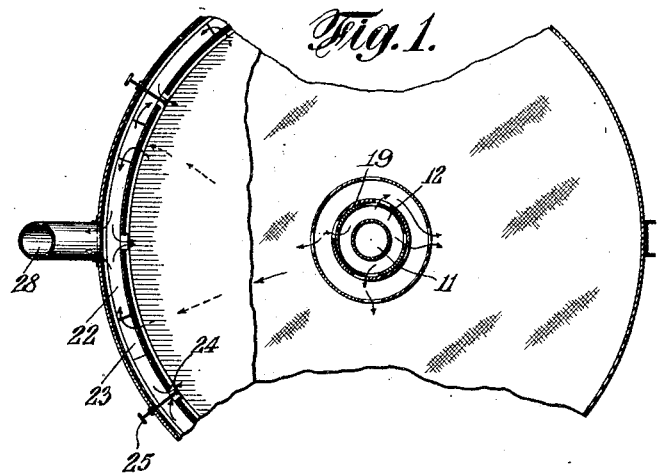
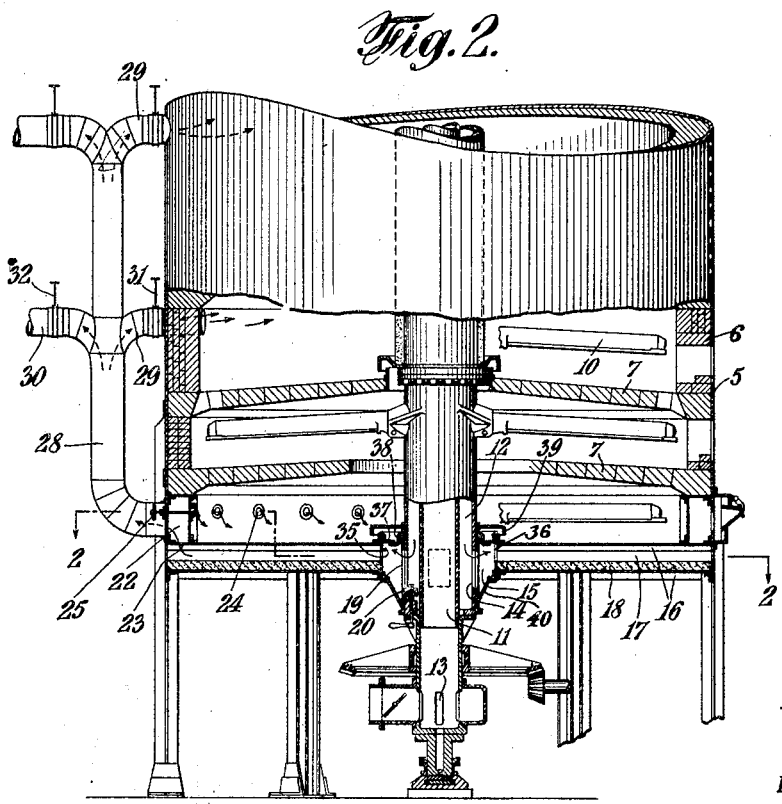
INVENTOR.
George E. Connolly.
BY Ward & Crosby
his ATTORNEYS.

Patented Oct. 14, 1930

1,778,144

UNITED STATES PATENT OFFICE

GEORGE E. CONNOLLY, OF OAKLAND, CALIFORNIA, ASSIGNOR TO NICHOLS COPPER COMPANY, OF NEW YORK, N. Y., A CORPORATION OF NEW YORK

FURNACE CONSTRUCTION

Application filed December 19, 1928. Serial No. 326,942.

This invention relates to furnaces and more particularly to furnaces designed for the heating or roasting of ores, concentrates and the like and in which the material is conveyed downwardly in a circuitous path over a series of hearths, by means of rabble or stirring arms.

The objects of the invention include the provision, in a practical furnace structure, of simple and efficient means for utilizing air to absorb heat at the bottom hearth of the furnace.

Certain phases of the invention also contribute to the efficiency of the furnace by the reduction of heat losses therein. To this end, the air which has passed through the bottom hearth and absorbed heat therefrom and which is preferably air which has been warmed previously by a heat interchange with the stirring or rabble arms, may be introduced into one or more of the roasting chambers to raise or regulate the temperatures therein.

These and other objects of the invention and the means for their attainment will be more apparent from the following detailed description, taken in connection with the accompanying drawings illustrating one embodiment by which the invention may be realized, and in which:

Fig. 1 is a transverse sectional view taken in the planes indicated by the broken lines 2—2 in Fig. 2 and looking in the direction of the arrows.

Fig. 2 is a view showing, in side elevation, the lower part of a furnace in accordance with this invention, parts being removed in the interest of clearness.

In the drawings, the furnace is illustrated as having a wall 5, 6 consisting of the outer metallic shell 5 suitably lined with heat resistant material 6. It is provided with a plurality of superposed hearths 7 defining the roasting chambers of the furnace. The material to be treated is introduced at the top of the furnace, and is caused to travel downwardly through the working chambers in a circuitous path, as is well understood in the art, by means of a rotary air-cooled stirring or rabble system. This system comprises generally a plurality of stirring or rabble arms 10 carried by a central double walled shaft 11, 12 which is rotated in any convenient manner. Air enters the inner conduit 11 of this shaft through any convenient air inlets, such as are shown at 13 and passes therefrom into and through the rabble arms 10 to cool the same. The air now raised in temperature by absorption of heat from the stirring arms returns to the annular space 12 of the shaft.

As illustrated, the lower portion of the outer space 12 is provided with one or more outlets 14 from which the warmed air may be discharged into a chamber 15 surrounding the shaft and conveniently carried with the bottom hearth 16. This chamber 15 communicates with a passage 17 in the bottom hearth. Preferably the bottom hearth is of metal and is hollow, the passage 17 thus comprising the interior of the hearth 16. To reduce heat losses, the bottom is insulated, as at 18. The flow of air from the outer shaft space 12 into the chamber 15 may be controlled by an adjustable cylindrical valve 19. This valve may be adjusted by means of a rack 20 on its inner periphery which is adapted to mesh with a manually operable pinion 21 carried with the shaft 11, 12.

The air passing through the hearth 17 absorbs heat from the material in the lowermost roasting chamber thus effecting, where desired, a reduction in the temperature of the bottom of the furnace and permitting the material therein to be discharged at a lower temperature.

From the interior of the bottom hearth the heated air may, if desired, be directed into one or more roasting chambers. To this end, the wall 5, 6 is formed with a peripheral passage 22 having openings 23 communicating with the interior 17 of the bottom hearth and from this space 22 the heated air can be introduced into the bottom roasting chamber through outlets 24. Also connected with the space 22 is shown a conduit 28 adapted to conduct warmed air from the passage 22 to one or more of the upper roasting chambers of the furnace as by branch pipes 29 leading therefrom. Branch pipes 30 may also lead from the main pipe 28 say to burners, as will be understood. Instead of the conduits, an air duct built within the furnace wall may serve to conduit the air to the place desired.

These branch conduits 29 and 30 are shown as provided with shutters or dampers 31 and 32 and similarly the outlets 24 leading to the bottom roasting chamber are illustrated as controlled by air deflecting and regulating dampers 25, operable from the exterior of the furnace. These dampers 31, 32 and 25 control the circulation of air through the bottom hearth and to the roasting chambers and burners and when they are present, the cylindrical valve 20 around the shaft bottom may be dispensed with if desired.

In the illustrated embodiment the bottom hearth comprises two spaced and preferably circular metal plates 16 conveniently carried upon the frame of the furnace. The top plate supports the material in the bottom roasting chamber and the bottom plate supports the layer 18 of insulating material in spaced relation with the top plate to provide the passage 17. Centrally, the plates 16 are formed with circular apertures at 35 in register with one another which receive the cylindrical portion 36 enclosing in part the chamber 15. At its upper edge cylinder 36 carries an inwardly extending flange construction 37, 38 provided with a stuffing box at its inner periphery, which makes a slip joint with the shaft 12 so as to prevent the escape of air, and the joint is prevented from becoming clogged by material on the bottom hearth by an overhanging deflector 39 also carried by shaft 12. At its lower edge cylinder 36 carries an inwardly extending flange or converging wall 40 provided with a stuffing box at its inner periphery which makes a slip joint with the shaft 12.

By the construction described, the thermal losses from furnaces of this nature are reduced since the heat absorbed by the air in cooling the rabble system is returned to the furnace, as is also the heat absorbed by the air in cooling the material on the bottom hearth. Furthermore, the air in the interior of the bottom hearth serves to reduce the temperature of the bottom of the furnace and minimize radiation losses.

The invention is particularly adaptable to furnaces for roasting pyrites, the calcination of soda ash, limestone or other carbonates, and for other furnace processes, particularly where it is unnecessary to conserve substantial portions of the heat in the discharged product.

Various modifications will occur to those skilled in the art, in the configuration and disposition of the component elements going to make up the invention as a whole, as well as in the omission of one or more features, and no limitation is intended by the phraseology of the foregoing description or illustrations in the accompanying drawings except as indicated in the appended claims.

What I claim as new and desire to secure by Letters Patent is:

1. In a roasting furnace, in combination, a plurality of superposed hearths, one of the lowermost hearths having a cavity for receiving cooling fluid, said cavity being sealed against communication with the spaces between hearths, a rotary air-cooled rabble system including a shaft and means to introduce the air from the lower part of said shaft to the interior of said hearth having a cavity.

2. In a roasting furnace, in combination, a plurality of superposed hearths, a rotary air-cooled rabble system including a shaft and a conduit communicating directly with the bottom of said shaft and with the interior of a lower hearth.

3. In a roasting furnace, in combination, a plurality of superposed hearths, a rotary air-cooled rabble system including a shaft, a conduit communicating directly with the bottom of said shaft and with a chamber beneath the lowermost hearth, and means to control the flow of air in said conduit.

4. In a roasting furnace, in combination, a plurality of superposed roasting chambers, a rotary air-cooled rabble system including a shaft, a conduit communicating with the bottom of said shaft and with a chamber, and a circular valve carried with said shaft and controlling the flow of air in said conduit.

5. In a roasting furnace, in combination, an outer wall, a plurality of superposed roasting chambers a rotary air-cooled rabble system including an ore cooling means at the bottom of the furnace containing an exterior conduit communicating directly with the bottom of the shaft.

6. In a roasting furnace, in combination, an outer wall, a plurality of superposed roasting chambers, a rotary air-cooled rabble system including a shaft, a conduit exteriorly of the outer wall and communicating directly with the bottom of said shaft to receive air therefrom, branch conduits leading from said conduit, certain of said conduits communicating respectively with roasting chambers, and means to control the flow of air in said conduits.

7. In a roasting furnace, in combination, a plurality of superposed hearths, the bottom hearth being formed with a passage, a rotary air-cooled rabble system including a shaft, and means including passages through the shaft wall at a point where the shaft passes through the said bottom hearth, to conduct air from the lower part of said shaft to said passage.

8. In a roasting furnace, in combination, a plurality of superposed hearths defining roasting chambers, the bottom hearth being formed with a passage, a rotary air-cooled rabble system including a shaft, means to conduct air from said shaft to said passage, and means to conduct air from said passage to a roasting chamber.

9. In a roasting furnace, in combination, a plurality of superposed hearths, the bottom hearth being formed with a passage, a rotary air-cooled rabble system including a shaft, means to conduct air from said shaft to said passage, and means to conduct air from said passage to the space above the bottom hearth.

10. In a roasting furnace, in combination, a plurality of superposed hearths defining roasting chambers, the bottom hearth being formed with a passage, a rotary air-cooled rabble system including a shaft having cooling air passing therethrough, means to control the flow of air from said shaft to said passage and means to conduct air from said passage to a chamber.

11. In a roasting furnace, in combination, an outer wall, a plurality of superposed hearths defining roasting chambers, the bottom hearth being hollow, the outer wall being formed with a peripheral passage proximate the bottom roasting chamber and communicating with the interior of the bottom hearth, a rotary air-cooled rabble system including a shaft, means to conduct air from the lower part of the shaft to the interior of the bottom hearth, and means to control the flow of such air.

12. In a roasting furnace, in combination, an outer wall, a plurality of superposed hearths defining roasting chambers, the bottom hearth being hollow and the outer wall being formed with a peripheral passage in communication with the interior of the bottom hearth, means to conduct air from said shaft to the interior of the bottom hearth, means to conduct air from said peripheral passage to a roasting chamber, and means to control the flow of such air.

13. In a roasting furnace, in combination, an outer wall, a plurality of superposed hearths defining roasting chambers, the bottom hearth being hollow and the outer wall being formed with a peripheral passage in communication with the interior of the bottom hearth, said passage having outlets into the bottom roasting chamber, a rotary air-cooled rabble system including a shaft, means to conduct air from the lower part of said shaft into said passage, a conduit exteriorly of the outer wall and leading from said passage to a roasting chamber, and means to control the flow of air through said conduit.

In testimony whereof I have signed my name to this specification.

GEO. E. CONNOLLY.